July 14, 1964 T. M. CORRY 3,141,110
INVERTER NETWORKS
Filed May 16, 1962

WITNESSES
Leon J. Yaga
James T. Young

INVENTOR
Thomas M. Corry
BY
John L. Houghton
ATTORNEY

United States Patent Office 3,141,110
Patented July 14, 1964

3,141,110
INVERTER NETWORKS
Thomas M. Corry, Monroeville, Pa., assignor to Westinghouse Electric Corporation, East Pittsburgh, Pa., a corporation of Pennsylvania
Filed May 16, 1962, Ser. No. 195,251
6 Claims. (Cl. 315—169)

This invention relates generally to electrical networks and more particularly to an inverter network for energizing a highly capacitive load.

An object of this invention is to provide a new and improved inverter network for supplying a capacitive load.

A further object of this invention is to provide such an inverter with a variable frequency output.

A still further object is to provide in such an inverter a wavefront which increases in steepness with an increase in output frequency of the inverter.

A still further object of this invention is to provide a source of variable frequency potential having a wavefront which increases in steepness as a function of the increase in its frequency.

Figure 1:
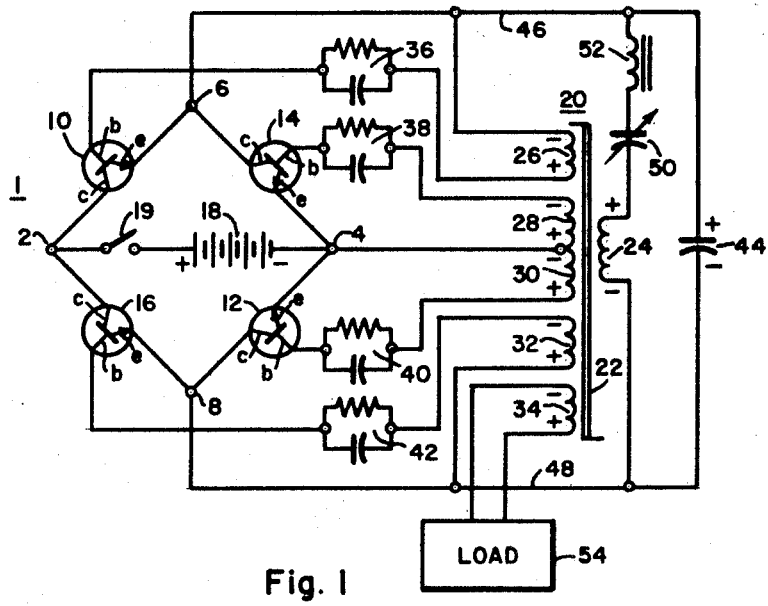
Figure 2:
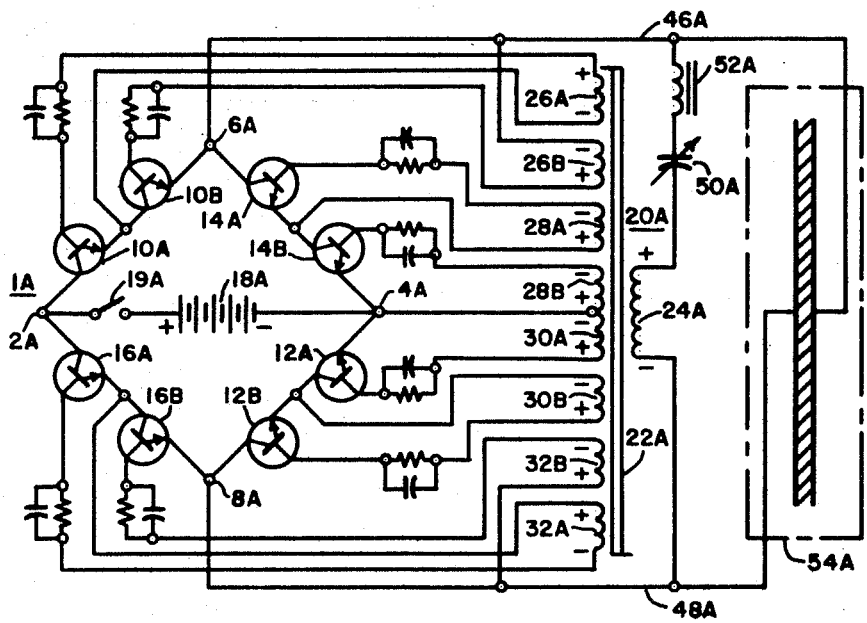

Other objects will be apparent from the specification, the appended claims and the drawings, in which drawings:

FIGURE 1 is a schematic view of a variable frequency inverter connected to supply an alternating potential with a wavefront which increases in steepness with increase in output frequency; and FIG. 2 is a schematic diagram of a modified form of the invention showing an inverter connected to energize a capacitive load device such as an electroluminescent panel.

Referring to the drawings by characters of reference the numeral 1 indicates generally an inverter having direct current input terminals 2 and 4 and alternating current output terminals 6 and 8. The inverter is shown as taking the form of a bridge in which current flow in the various arms is controlled by means of current controlling valves 10, 12, 14 and 16 which preferably are transistors. The main current paths of the valves 10, 12, 14 and 16, which comprise an emitter e and collector c, are connected between the terminals 2 and 6, the terminals 4 and 8, the terminals 6 and 4 and the terminals 2 and 8, respectively. More specifically, the collectors c of the transistors 10 and 16 are connected to the positive input terminal 2 while the emitters e thereof are respectively connected to the alternating current output terminals 6 and 8 and the emitters e of the transistors 12 and 14 are each connected to the negative potential input terminal 4 while the collectors c are respectively connected to the alternating current output terminals 8 and 6. A suitable source of direct potential such as the battery 18 is connected to supply a direct potential between the terminals 2 and 4 through a controlling switch 19.

Conduction of the transistors 10, 12, 14 and 16 is controlled by means of a transformer 20 having a saturable core 22, a primary winding 24 and secondary windings 26, 28, 30, 32 and 34. The secondary winding 34 of the transformer 20 is connected to a load 54 which is to be energized with a pulsating voltage having a wavefront which becomes progressively steeper as the frequency thereof becomes greater. The secondary or transistor controlling windings 26, 28, 30 and 32 are respectively connected between the bases b and emitters e of the transistors 10, 14, 12 and 16 through suitable time delay or self-biasing networks 36, 38, 40 and 42. Each of these networks comprises a resistor parallelly connected with a capacitor and is energized by the control current supplied to the transistors.

The primary winding 24 of the transformer 20 is series connected with a variable capacitor 50 and an inductor 52 between a pair of output busses 46 and 48 which are connected to the alternating current output terminals 6 and 8 respectively, a second capacitor 44 is connected between the busses 46 and 48 to provide with the capacitor 50 and the inductor 52 a resonant circuit for controlling the off times of the transistors 10, 12, 14 and 16.

Preferably the sum of the magnitudes of the impedances of the reactive elements 50 and 52 is small as compared with the impedance of the winding 24 prior to saturation of the core 22. Under these conditions, the conducting time of the transistors will be relatively independent of the output frequency of the inverter 1 while the off time of the transistors will be primarily dependent upon the oscillating frequency of the reactive elements 44, 50 and 52. This is for the reason that, prior to saturation of the core 22, substantially all of the voltage appears across the winding 24 and little, if any, voltage appears across the reactive elements 50 and 52. Additionally, due to the conducting condition of the transistors 10 and 12 or 14 and 16 during the saturating time interval a substantially constant potential is supplied to the transformer 20. As will be set out below this is not exactly true, but will be so assumed for the present.

When the core 22 saturates, the voltage drop thereacross approaches zero and the circuit then resonates in accordance with well known principles. During this resonating period, no drive current is supplied to any of the transistors and all thereof remain in their minimum or non-conducting state. The time interval for this reversal of voltage is substantially one-half cycle of the resonant frequency of the reactive elements 44, 50 and 52. The time period of the output cycle of the inverter 1 is equal to the sum total of the time period of a full resonant frequency cycle plus twice the time period required to saturate the core 22; the variable period portion to change the output frequency mainly being due to changes in the period of the resonant frequency cycle.

As just stated, the time interval required to saturate the transformer core 22 remains fairly constant, but not completely constant. This is because of the voltage which appears across the capacitor 50 at the instant that the current reverses in the winding 24 is of a polarity which is additive with respect to the voltage which is applied between the output conductors 46 and 48 by the inverter 1. This voltage adding effect becomes greater as the magnitude of the capacitance of the capacitor 50 becomes less to increase the operating frequency of the inverter 1 and vice versa and tends to shorten and lengthen the conducting period of the transistors as the frequency increases and decreases. This change in potential across the capacitor 50 also changes the steepness of the wavefront of the output potentials developed in the secondary windings 26, 28, 30, 32 and 34 whereby the loads connected thereto are energized with wavefronts which become progressively steeper as the output frequency of the inverter 1 is increased.

This operating characteristic is desirable for many types of loads as represented by the load 54 and is desirable for driving transistors since the steeper wavefront results in a faster "turn on" which helps reduce transistor losses which would otherwise accumulate due to the greater number of "turn-ons" which occur at the increased frequency. It will be appreciated that with the network illustrated the current at "turn-off" time of the transistors will be relatively small because of the nearly fully changed condition of the capacitor 44 at this time.

The remaining details of construction may best be set forth by a description of operation of the inverter which operation is initiated by closure of the switch 19 which energizes the input terminals 2 and 4. When this occurs current flows from the battery 18 through the transistors 10 and 16 to the alternating current terminals 6 and 8 and therefrom through the transistors 14 and 12 and the terminal 4 to the negative terminal of the battery 18. Because of the unavoidable inherent differences between the various ones of the transistors 10, 12, 14 and 16, the current therethrough will not be equal and a potential difference will be established between the terminals 6 and 8. For purposes of explanation it is assumed that the potential of terminal 6 is somewhat positive relative to that of the terminal 8 causing current to flow from the terminal 6 through the inductive reactor 52, capacitor 50, and primary winding 24 of the transformer 20 to the terminal 8. This current flow causes the transformer to assume potential polarities as indicated by the + and − marks. This tends to render the transistors 10 and 12 more conductive and the transistors 14 and 16 less conductive whereby the potential between the terminals 6 and 8 increases causing a progressively greater current flow through the primary winding 24 of the transformer 20 and render the transistors 10 and 12 still more conductive and the transistors 14 and 16 still less conductive. This regenerative action takes place rapidly and the transistors 10 and 12 are quickly brought into a fully conducting condition and the transistors 14 and 16 into a fully blocked condition. As will be apparent to those skilled in the art the fully blocked condition does not necessarily mean that they have infinite resistance, but merely a very high impedance and little, if any, current flow. A fully conductive condition indicates that the transistor is operating at minimum impedance.

With transistors 10 and 12 fully conducting the terminal 6 will be rendered substantially at the potential of the positive terminal thereof and current will flow from the battery 18 through the transistor 10, bus 46 and primary circuit of the transformer 24 as well as to the capacitor 44 which quickly charges.

Soon after the transistors 10 and 12 became conducting, the core 22 of the transformer 20 saturates thereby substantially deenergizing the secondary windings 26, 28, 30, 32 and 34. When this occurs, the drive current for the transistors 10 and 12 disappears and the transistors will return to their non-conducting conditions and the transistors 10, 12, 14 and 16 remain non-conducting until current reverses in the winding 24.

At the time the transistors 10 and 12 became non-conducting, the upper plate or terminal of the capacitor was positive with respect to its lower plate or terminal and current flows downwardly through the inductive reactance 52, capacitor 50, winding 24 back to the negative plate thereof in the same direction as it did when the transistors 10 and 12 were conducting thereby maintaining the core 22 saturated. The time period of this current flow, as stated above, will be controlled by the magnitude of the values of the reactive elements 44, 50 and 52. At the end of a half-cycle of the resonant frequency of the elements 44, 50 and 52, the current flow from the capacitor 44 through the winding 24 will terminate and reverse. This reverses the flux in the core 22 to induce a voltage in the windings 26, 28, 30, and 32 in a direction tending to render the transistors 14 and 16 conducting and the transistors 10 and 12 blocked. The regenerative effect similar to that described above occurs and the transistors 14 and 16 rapidly become fully conductive and the transistors 10 and 12 fully non-conductive whereby the terminal 8 becomes positive with respect to the terminal 6 and current flows upwardly through the primary winding 24. The potential across the capacitor 50 is in additive relation with the supply voltage and tends to increase the rate of change of the flux in the core 22 to further increase the speed at which the transistors 14 and 16 become conducting and the transistors 10 and 12 become blocked. During this interval, battery current flows into the capacitor 44 fully charging the capacitor to substantially the potential of the battery 18. This condition exists and current flows upwardly through the primary winding 24 until the core 22 again saturates at which time the secondary windings 26, 28, 30, 32 and 34 become deenergized and the transistors 14 and 16 block in substantially the same manner described above. Again the capacitor 44 discharges through the winding 24 to maintain the core 22 saturated. Eventually, the current will reverse to drive core 22 out of saturation and a voltage will be induced in the secondary windings 26, 28, 30 and 32 to regeneratively render the transistors 10 and 12 conducting and the transistors 14 and 16 in a fully blocked condition. The frequency of oscillation of the voltage of the busses 46 and 48 is determined by means of the capacitance of the capacitors 44 and 50 and the inductance of the inductor 52 and of the characteristics of the saturable core transformer 20. Preferably, the value of the capacitance of the capacitor 50 is less than that of the capacitor 44 whereby the voltage thereacross will be additive with respect to the source of voltage in order to provide for a quick build-up of the current flow through the primary winding 24 and, therefore, a steep wavefront of the voltage induced in the secondary windings of this transformer.

In FIG. 2 there is shown a bridge-type inverter 1A energized from a suitable source of potential such as battery 18A and having direct current input terminals 2A and 4A and alternating current output terminals 6A and 8A. In order that the battery 18A may have a higher potential than the potential which may be interrupted by a single transistor, a plurality of series connected transistors 10A and 10B, 12A and 12B; 14A and 14B, and 16A and 16B are used in place of single transistors. This makes it necessary to provide additional controlling windings on the core 22A of the transformer 20A, as illustrated. The primary winding 24A of the transformer 20A is connected through capacitor 50A, which may be variable if a variable frequency output is desired, and an inductive reactor 52A to the alternating current output conductor 46A. The other terminal of the winding 24A is connected to the other alternating current output conductor 48A. In FIG. 2 the load 54A is capacitive in nature and serves the same purpose as the capacitor 44 of the form shown in FIG. 1. A suitable load 54A would be an electroluminescent panel.

It is believed that the operation of the network in FIG. 2 will be apparent from the above description provided in connection with FIG. 1 and a further amplification thereof is not believed necessary.

Although the invention has been described with reference to certain specific embodiments thereof as for example in bridge type arrangements numerous modifications are possible as for example push-pull type arrangements and it is desired to cover all modifications falling within the spirit and scope of the invention.

What is claimed and is desired to be secured by United States Letters Patent is as follows:

1. In a network of the character described, a pair of input terminals, a first capacitor, a second capacitor, an inductor, a saturating core transformer having a primary winding and secondary winding means, first and second busses, means connecting said inductor and said first capacitor and said primary winding in series between said busses, means connecting said second capacitor between said busses, switch means having control means effective to operate said switch means in response to the application of potentials of alternate polarity being applied thereto, means including said switch means interconnecting said busses and said input terminals whereby said busses are energized from said input terminals in alternate polarity as a consequence of said operation of said switch means, and means interconnecting said secondary winding means and said control means whereby said switch means is energized with alternate polarity.

2. In a network of the character described, a pair of input terminals, a first capacitor, a second capacitor, an inductor, a saturating core transformer having a primary winding and secondary winding means, first and second busses, means connecting said inductor and said first capacitor and said primary winding in series between said busses, means connecting said second capacitor between said busses, switch means having control means effective to operate said switch means in response to the application of potentials of alternate polarity being applied thereto, means including said switch means interconnecting said busses and said input terminals whereby said busses are energized from said input terminals in alternate polarity as a consequence of said operation of said switch means, and means interconnecting said secondary winding means and said control means whereby said switch means is energized with alternate polarity, said second capacitor having a capacitance value substantially in excess of the capacitance value of said first capacitor.

3. In a network of the character described, a pair of input terminals, a first capacitor, a second capacitor, an inductor, a saturating core transformer having a primary winding and first and second secondary winding means, a pair of output terminals energized from said first secondary winding means, first and second busses, means connecting said inductor and said first capacitor and said primary winding in series between said busses, means connecting said second capacitor between said busses, switch means having control means effective to operate said switch means in response to the application of potentials of alternate polarity being applied thereto, means interconnecting said busses and said input terminals and including said switch means whereby said busses are energized from said input terminals in alternate polarity as a consequence of said operation of said switch means, and means interconnecting said secondary winding and said control means whereby said switch means is energized with alternate polarity.

4. In an electrical network for energizing an alternating current load from a source of direct current, a pair of input terminals, a pair of output terminals, a capacitive load connected to said output terminals, first and second valve devices, each said device having a main current circuit and a control circuit controlling at least the initiation of current through its said main circuit, a first current path interconnecting said input terminals and said load terminals and including said main circuit of said first valve device, said first path being effective as a consequence of the conducting of said first valve to cause current flow through said load in a first direction, a second current path connected to said load terminals and including said main circuit of said second valve, said second path being effective as a consequence of the conduction of said second valve to cause current to flow through said load in a second direction, a saturating core transformer having a primary winding and secondary winding means, a capacitor, an inductor, means connecting said primary winding and said capacitor and said inductor in series circuit between said output terminals, and means connecting said secondary winding means to said control circuits of said valve devices in a polarity to render said main paths conductive alternately in response to the alternating output polarity of said secondary winding.

5. In combination an electroluminescent panel and an inverter, said panel having panel terminals, said inverter including a pair of input terminals adapted to be connected to a source of unidirectional voltage and output terminals connected to said panel terminals, said inverter including a pair of paths interconnecting said input terminals with said output terminals, a first of said paths including a first semiconductor switch and a second of said paths including a second semiconductor switch, a saturating core transformer having a primary winding and secondary winding means, a first impedance device having a capacitive reactance characteristic, a second impedance device having an inductive reactance characteristic, said primary winding and said impedance devices being connected to provide a series array, said array being connected in parallel with said panel, and means interconnecting said secondary winding means to said switches in a polarity to alternately close said switches in response to the alternating output polarity of the potential induced in said secondary winding means.

6. In combination; a capacitive load, an inverter having direct current input terminals and alternating current output terminals connected to said load, first and second three electrode semiconductor current controlling devices, a first current path interconnecting said input and said output terminals and including two of said three electrodes of a first of said semiconductor devices, a second current path interconnecting said input and said output terminals and including two of said three electrodes of a second of said semiconductor devices, and a saturating core transformer having a primary winding and secondary winding means, said second winding means being connected between a third of said terminals and one of said two terminals of each said semiconductor device in such polarity that only one of said paths is rendered conducting at one time; a capacitive element; an inductive element; and means connecting said primary winding and said elements in series with each other and in shunt with said load.

No references cited.